United States Patent
Harting et al.

[11] Patent Number: 6,113,420
[45] Date of Patent: Sep. 5, 2000

[54] TENSION-RELIEVING ARRANGEMENT FOR THE ELECTRICAL AND/OR OPTICAL CONDUCTORS OF A CABLE

[75] Inventors: Dietmar Harting, Espelkamp; Achim Brenner; Heinz Lambrecht, both of Lübbecke; Dirk Oberhokamp, Herford; Stephan Schreier, Rahden; Horst Nowacki; Ralf Bokämper, both of Lübbecke, all of Germany

[73] Assignee: Harting KGaA, Espelkamp, Germany

[21] Appl. No.: 09/099,185

[22] Filed: Jun. 18, 1998

[30] Foreign Application Priority Data

Jun. 18, 1997 [DE] Germany .............................. 197 25 732
Dec. 13, 1997 [DE] Germany .............................. 197 55 530

[51] Int. Cl.[7] ..................................................... H01R 13/58
[52] U.S. Cl. ........................................... 439/459; 439/407
[58] Field of Search ..................................... 439/459, 404, 439/417, 461

[56] References Cited

U.S. PATENT DOCUMENTS

| 1,398,228 | 11/1921 | Grigsby | 439/461 |
| 4,960,390 | 10/1990 | Davis et al. | 439/459 |
| 5,440,073 | 8/1995 | Lin et al. . | |
| 5,599,202 | 2/1997 | Key | 439/459 |

FOREIGN PATENT DOCUMENTS

| 0 563 995 A1 | 10/1993 | European Pat. Off. . |
| 196 05 083 A1 | of 0000 | Germany . |
| 29 31 331 A1 | 2/1981 | Germany . |
| WO 97/06580 A1 | of 0000 | WIPO . |

*Primary Examiner*—Paula Bradley
*Assistant Examiner*—Katrina Davis
*Attorney, Agent, or Firm*—McEachran, Jambor, Keating, Bock & Kurtz

[57] ABSTRACT

A tension-relieving assembly for electrical and/or optical conductors of a cable, wherein the conductors, which are guided in parallel in the cable, are held in a cable-guiding part and are inserted in conductor-guiding ducts in a conductor-guiding part, and wherein the axes of the conductors in the cable-guiding part and in the conductor-guiding part are offset relative to one another. The conductor-guiding part is provided, at the lead-in end for the conductors, with an annular collar, and a central peg is disposed in the annular collar. The cable-guiding part is constructed, at the conductor exit end, with a stepped recess, such that when the cable-guiding part and conductor-guiding part are joined together, the central peg is pressed between the conductors and forces the conductors outwards against the inner contour of the stepped recess in the cable-guiding part.

7 Claims, 4 Drawing Sheets

TENSION-RELIEVING ARRANGEMENT FOR THE ELECTRICAL AND/OR OPTICAL CONDUCTORS OF A CABLE

FIELD OF THE INVENTION

The invention relates to a tension-relieving arrangement for the electrical and/or optical conductors of a cable, wherein the conductors, which are guided in parallel in the cable, are held in a cable-guiding part and are inserted in conductor-guiding ducts in a conductor-guiding part, and wherein the axes of the conductors in the cable-guiding part and in the conductor-guiding part are offset relative to one another.

BACKGROUND OF THE INVENTION

Tension-relieving systems of this kind are necessary in order to protect the contact points, which are formed from a core and a contact element, against the external introduction of force via the cable, and thus to guarantee a uniform contact pressure between the core and contact element.

From WO 97/06580, cable-connecting elements for connecting insulated electrical conductors are known which consist of a number of individual parts incapable of being pre-assembled, and have a cable-slip protection system inside an insulating piece (that is to say, in the obliquely extending region of the conductor-guiding ducts).

A disadvantage of this known cable-slip protection system lies in the fact that, after the making of contact between the individual cores in the obliquely extending part of the conductor-guiding duct, the insulation is severely deformed in such a way that the individual core cannot be introduced into the conductor-guiding duct in a repeatable manner, without the core having to be shortened. Furthermore, it is possible for the insulation to break off when the connection in the conductor-guiding duct is undone, and to prevent repeated introduction of the core.

SUMMARY OF THE INVENTION

The object underlying the invention is to construct a tension-relieving system of the initially mentioned type in such a way that axial displacement of the conductors during contact-making or assembly is prevented.

This object is achieved through the fact that the conductor-guiding part has a circumferential collar at the lead-in end for the conductors, that a fixing element is disposed in the recess formed under those circumstances, that the conductor-guiding ducts extending axially in the conductor-guiding part are disposed in the intervening space formed by the circumferential collar and the fixing element, that the cable-guiding part has, at the conductor exit end, an outer diameter which is adapted to the collar or to the recess, under which circumstances the conductor-guiding part can be inserted in the opening formed by the collar, and that the conductor exit end has a recess into which the fixing element is immersed when the cable-guiding part and the conductor-guiding part are joined together, under which circumstances the fixing element is pressed centrally between the conductors and forces the latter outwards against the wall of the recess.

Advantageous refinements of the invention are indicated as follows.

The advantages that can be achieved with the invention consist particularly in the fact that the individual components can be pre-assembled to form an easy-to-assemble unit, and the unit pre-assembled in this way represents a loss-protection system for the individual components, and subsequent operations, such as for example defined cutting-off and after-treatment of the conductors, are thereby facilitated.

Another advantage lies in the fact that axial displacement of the conductors during contact-making is prevented.

In another refinement, another advantage of the invention lies in the fact that radial twisting of the cable and of the conductors with respect to the conductor-guiding part is prevented.

BRIEF DESCRIPTION OF THE DRAWINGS

An exemplified embodiment of the invention is represented in the drawings and will be described in greater detail below. In the drawings.

DETAIL DESCRIPTION OF THE PREFERRED EMBODIMENTS

Figure 1:
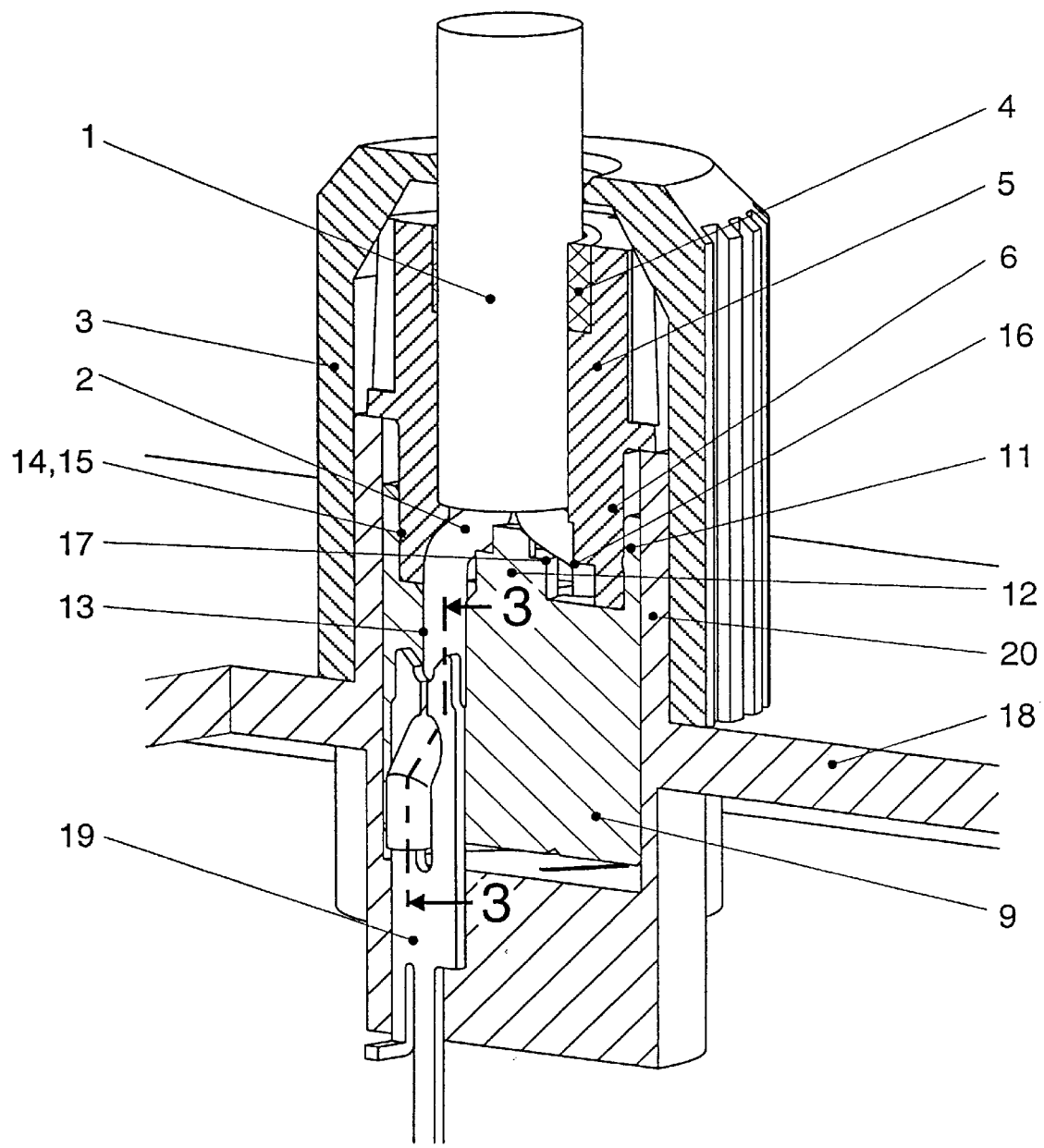
FIG. 1 shows a view of a cable-connecting element for electrical conductors, in a cut-away representation in perspective.
Figure 2:
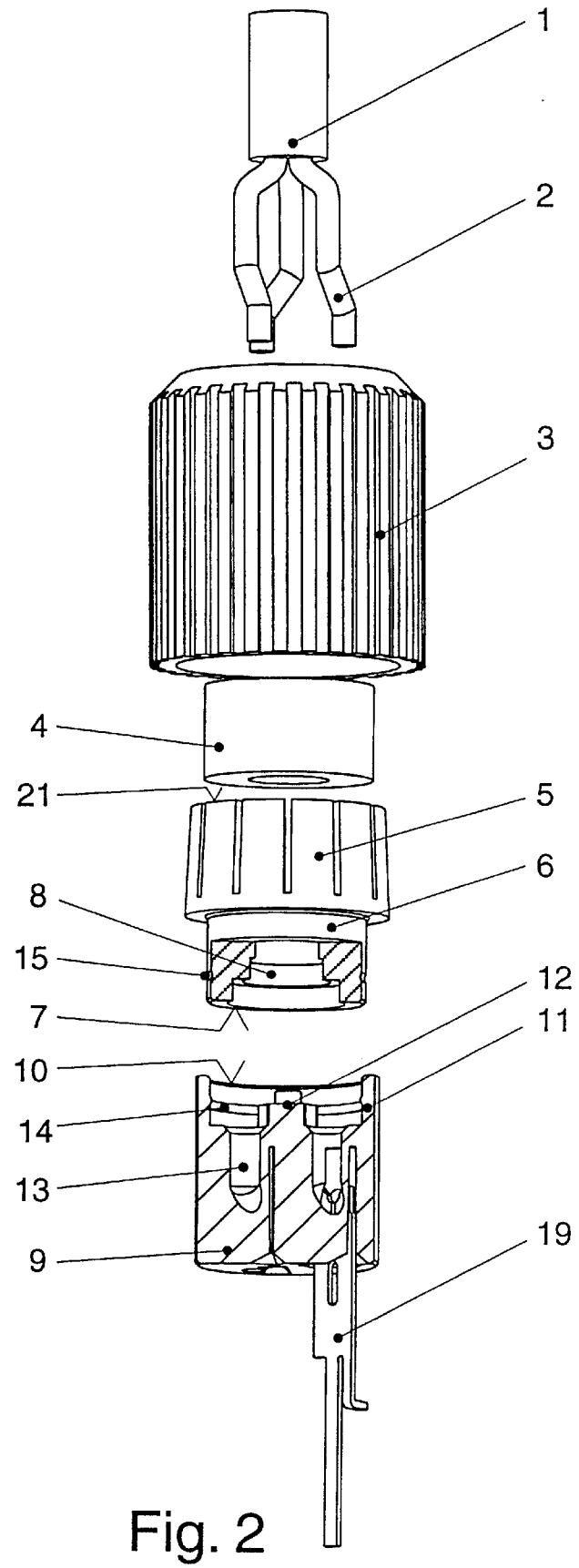
FIG. 2 shows a view of the cable-connecting element according to FIG. 1, in an exploded representation in perspective.
Figure 4:
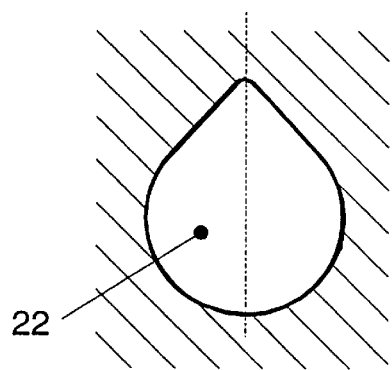
FIG. 4 shows a sectional view of the conductor-guiding duct according to FIG. 3, along the line 4—4.
Figure 3:
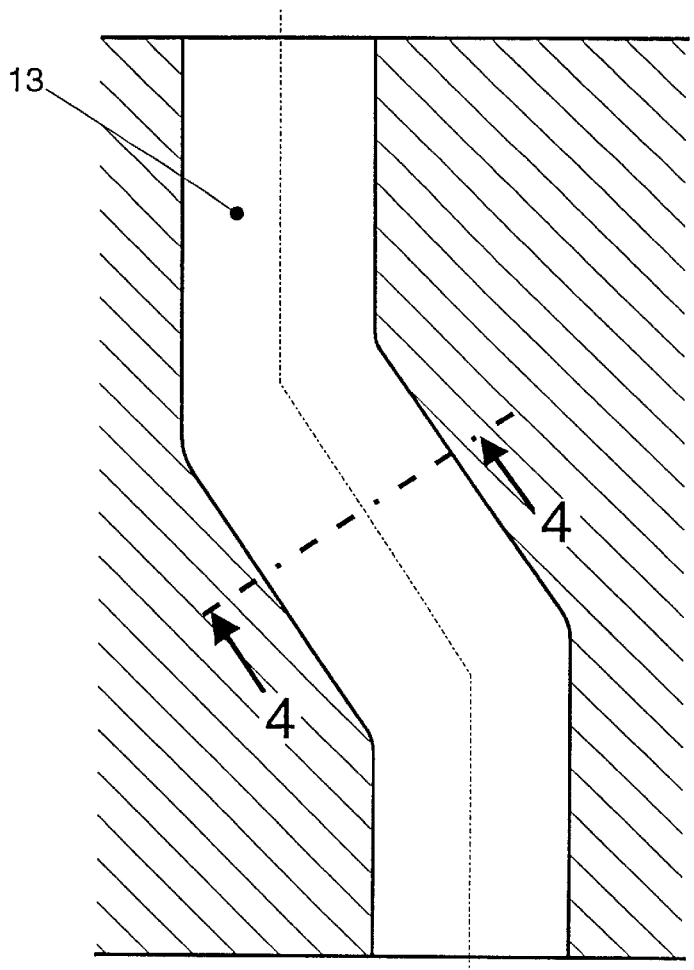
FIG. 3 shows an enlarged sectional view of the conductor-guiding duct in the conductor-guiding part with a wedge-shaped cross-section according to FIG. 1, along the line 3—3.

For the sake of simplification and to enable details to be better identified, FIGS. 1 and 2 represent only one conductor and one cutting terminal in each case. Conductor-guiding ducts, in which the conductors are guided, are represented in FIGS. 3 and 4.

As represented in FIGS. 1 and 2, a cap nut 3 and a cable-guiding part 5 are pushed over a cable 1 which is fed in. A rubber ring 4 is inserted in the cable-guiding part 5 and serves to relieve the cable 1 as a whole of tension. At the cable exit end 7, the cable-guiding part 5 possesses a cylindrical extension 6 which has a central, step-shaped recess 8. The insulation is removed from the cable 1 at its end which is guided through the cable-guiding part 5, so that individual insulated conductors 2 protrude from the cable sheath. At the conductor lead-in end 10, the conductor-guiding part 9 possesses a circumferential collar 11. At the conductor lead-in end 10, the conductor-guiding part 9 has, inside the circumferential collar 11, a centrally disposed, step-shaped fixing element 12 which is shaped in a manner corresponding to the step-shaped recess 8 in the cylindrical extension 6 of the cable-guiding part 5. Located between the circumferential collar 11 and the fixing element 12 of the conductor-guiding part 9 are the lead-in openings of conductor-guiding ducts 13, into which the individual conductors 2 of the cable are introduced. The conductor ends are introduced into the conductor-guiding ducts 13 to an extent such that they emerge on the lower end face of the conductor-guiding part 9. The cable-guiding part 5 is introduced, with its cylindrical extension 6, into the circumferential collar 11 on the conductor-guiding part 9. On the inside of the circumferential collar 11, the conductor-guiding part 9 possesses a circumferential elevation 14 which is shaped in a manner corresponding to a circumferential groove 15 on the outer face of the cylindrical extension 6 of the cable-guiding part 5. Provision may, optionally, also be made for the conductor-guiding part to be provided with a groove, and the outer face of the extension with a corresponding elevation. When the cable-guiding part 5 and conductor-guiding part 9 are assembled, the two parts are brought together under pressure until the circumferential elevation 14 on the conductor-guiding part engages in the circumferential groove 15 in the cable-conducting part. The fixing element 12 is thereafter located centrally between the conductors 2 and forces the latter against the step-shaped recess 8 in the cable-guiding part 5. The step-shaped contours on the cable-guiding part 5 and the conductor-guiding part 9 form wedging edges 16, 17 against which the conductors 2 are wedged as a result of the assembly of the two parts, and thereby fixed.

The conductor ends projecting out of the conductor-guiding part 9 are severed on the underside of the said conductor-guiding part 9, so that they no longer protrude from the latter. The pre-assembled unit consisting of the cable-guiding part 5 and the conductor-guiding part 9 is introduced into the housing 18 and the cutting terminals 19, which are inserted in the housing 18, thus penetrate into slot-shaped recesses on the underside of the conductor-guiding part 9. The cap nut 3 guided on the cable 1 is screwed onto a threaded union 20 on the housing 18. At the cable entry end 21, the cable-guiding part 5 is forced together by the upwardly tapering cap nut 3 and thus acts on the rubber ring 4 inserted in the cable-guiding part 5. The rubber ring acts on the cable 1 guided therein and fixes it, by which means the cable as a whole is relieved of tension. The cap nut 3 is screwed further onto the threaded union 20 on the housing 18 and guides the cable-guiding part 5, and also, with it, the conductor-guiding part 9, downwards over the cutting terminals 19 inserted in the housing 18. In the bent path of the conductor-guiding duct 13, the cutting terminals 19 meet the particular conductor 2 and force it into the wedge-shaped cross-section 22 of the conductor-guiding duct 13, as a result of which the conductor 2 is centered in relation to the particular cutting terminal 19. The cutting terminals 19 pass onwards into the conductor-guiding part 9, pass through the insulation of the conductors 2 and make contact with the latter.

The tension-relieving arrangement described above may optionally also be constructed for relieving light-wave conductors, which are to be introduced into a housing or apparatus, of tension. In that case, however, a few modifications must be provided for.

Since no cutting terminals are used in the case of light-wave conductors, the bent path of the conductor-guiding duct 13 is also eliminated. The conductor-guiding duct 13 for light-wave conductors need have no bent path, so the light-wave conductor undergoes no inadmissibly high bending. So as not to damage the insulation of the light-wave conductor, the fixing element 12 is of conical design and is equipped, at the periphery, with suitable wedging devices 16, 17. The light-wave conductors 2 are fixed as a result of assembly of the cable-guiding part 5 and the conductor-guiding part 9. The light-wave conductors in the pre-assembled unit are then shortened on the underside of the conductor-guiding part 9, whereupon they are polished with a special device.

Figure 5:
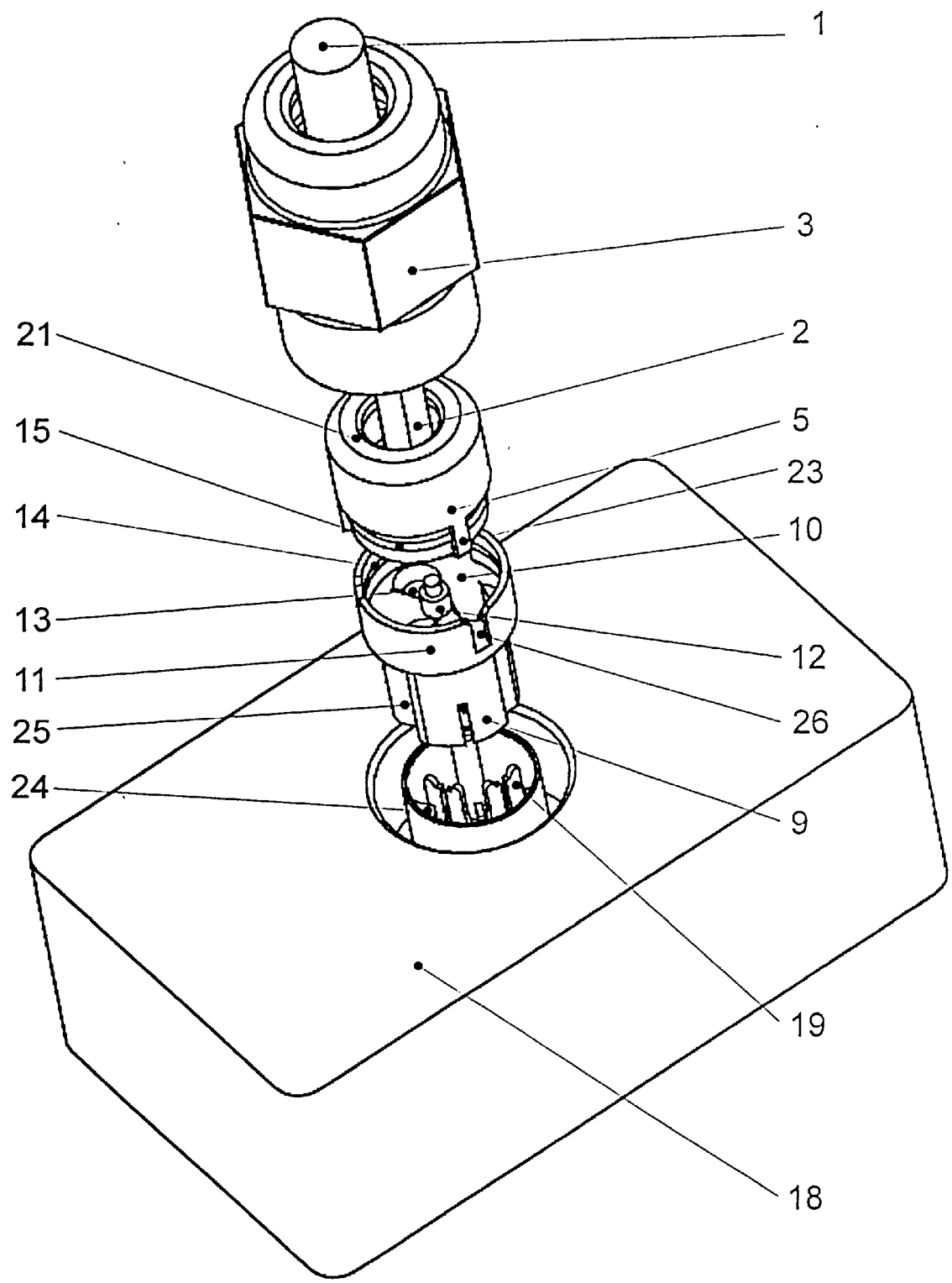
FIG. 5 shows a view of a cable-connecting element in an exploded representation in perspective.

FIG. 5 shows a modified construction of a cable-connecting element in the case of a housing 18. In this instance, the cable-guiding part 5 is provided with at least one nose 23 which engages in a form-locking manner in a groove 26 in the conductor-guiding part 9, and thus prevents radial twisting of the cable-guiding part with respect to the conductor-guiding part 9. On the inside of the collar 11, the conductor-guiding part 9 possesses a circumferential elevation 14 which is shaped in a manner corresponding to a circumferential groove 15 on the outer face of the cylindrical extension of the cable-guiding part 5. Here too, provision may optionally be made for the conductor-guiding part to be provided with a groove, and the outer face of the extension with a corresponding elevation. When the cable-guiding part 5 and conductor-guiding part 9 are assembled, the two parts are brought together under pressure until the circumferential elevation 14 on the conductor-guiding part engages in the circumferential groove 15 in the cable-conducting part. The fixing element 12 is thereafter located centrally between the conductors 2 and forces the latter against the step-shaped recess in the cable-guiding part 5. The step-shaped contours on the cable-guiding part 5 and conductor-guiding part 9 form wedging edges against which the conductors 2 are wedged as a result of the assembly of the two parts, and thereby fixed.

The conductor ends projecting out of the conductor-guiding part 9 are severed on the underside of the said conductor-guiding part 9, so that they no longer protrude from the latter. The pre-assembled unit consisting of the cable-guiding part 5 and the conductor-guiding part 9 is introduced into the housing 18. The conductor-guiding part 9 has fixing elements, such as noses 24 for example, which engage in corresponding grooves 25 in the housing 18. As a result of this, the pre-assembled unit is likewise protected against radial twisting.

The cutting terminals 19, which are inserted in the housing 18, penetrate into slot-shaped recesses on the underside of the conductor-guiding part 9. The cap nut 3 guided on the cable 1 is screwed to the housing 18. At the cable entry end 21, the cable-guiding part 5 is forced together by the upwardly tapering cap nut 3 and thus acts on the rubber ring inserted in the cable-guiding part 5. The said rubber ring acts on the cable 1 and fixes it, by which means the cable as a whole is sealed and relieved of tension.

In an alternative solution, the cable-guiding part 5 consists of a flexible material, so the rubber ring can be dispensed with. The cable-guiding part 5 then takes over the tension-relieving and sealing function.

The cap nut 3 is screwed to the housing 18 and guides the cable-guiding part 5, and also, with it, the conductor-guiding part 9, downwards over the cutting terminals 19 inserted in the housing 18. In the bent path of the conductor-guiding duct 13, the cutting terminals 19 meet the particular conductor 2 and force it into the conductor-guiding duct 13. The cutting terminals 19 pass onwards into the conductor-guiding part 9, pass through the insulation of the conductors 2 and make contact with the latter.

What is claimed is:

1. A tension-relieving assembly for a cable (1) having parallel extending insulated conductors (2) provided thereon, said assembly including a cable guiding member (5) and a conductor guiding member (9), conductor guiding ducts (13) formed in said conductor guiding member (9) in an offset relation to said insulated conductors (2) and said cable (1) characterized in that:

said conductor guiding member (9) is formed with a conductor lead-in end (10) facing said cable guiding member (5), an annular collar (11) is located at said lead-in end (10), a fixing element (12) is located inwardly of said annular collar (11) and cooperates with said annular collar (11) to define an annular space therebetween, said conductor guiding ducts (13) open into said annular space, said cable guiding member (5) has a cable exit end (7) facing said conductor guiding member (9), walls defining a stepped recess (8) are formed in said cable guiding member (5) inwardly of said cable exit end (7), said cable guiding member (5) is shaped to mate with said conductor guiding member (9) so that said fixing element (12) extends into said stepped recess (8) to engage said insulated conductors (2) and force them against said walls of said stepped recess (8), said conductor-guiding ducts (13) extend axially through said conductor-guiding part (9) and define a path which is bent twice, and said conductor-guiding part (9) is provided with slot shaped recesses adapted to receive ends of cutting terminal contacts (19), said ends passing through said bent region of said conductor-guiding ducts (13).

2. Tension-relieving assembly according to claim 1, characterized in that the fixing element (12) is constructed as a central peg.

3. Tension-relieving assembly according to claim 1, characterized in that the conductor-guiding ducts (13) have a wedge-shaped cross-section (22) in the bent region.

4. The tension-relieving assembly of claim 1 characterized in that:

said cable-guiding member (5) and said annular collar (11) on said conductor-guiding part (9) are provided with engaging means which engage with one another when said cable guiding member (5) is inserted in said annular collar (11) and engages an annular bead (14) formed therein.

5. Tension-relieving assembly according to claim 1, characterized in that the cable-guiding member (5) and the conductor-guiding member (9) are fixed to one another in a form-locking, twist-proof manner by means of a nose (23)/groove (26) connection.

6. Tension-relieving assembly according to claim 5, characterized in that the cable-guiding part (5) and/or the conductor-guiding part (9) are fixed to the housing (18) in a form-locking, twist-proof manner by means of a nose (24)/groove (25) connection.

7. Tension-relieving assembly according to claim 5, characterized in that the cable-guiding member (5) consists of elastic material which brings about sealing of the system as a whole and, at the same time, ensures that the cable is relieved of tension.

* * * * *